VIDEO-FROM-SYNC AND SYNC-FROM-SYNC SEPARATOR

Filed May 21, 1949 3 Sheets-Sheet 1

ERWIN M. ROSCHKE
WALTER S. DRUZ
INVENTORS.

BY Francis W. Crotty
THEIR ATTORNEY

Oct. 20, 1953 E. M. ROSCHKE ET AL 2,656,414

VIDEO-FROM-SYNC AND SYNC-FROM-SYNC SEPARATOR

Filed May 21, 1949 3 Sheets-Sheet 2

ERWIN M. ROSCHKE
WALTER S. DRUZ
*INVENTORS.*

BY Francis W. Crotty

THEIR ATTORNEY

VIDEO-FROM-SYNC AND SYNC-FROM-SYNC SEPARATOR

Filed May 21, 1949 3 Sheets-Sheet 3

ERWIN M. ROSCHKE
WALTER S. DRUS
*INVENTORS.*

BY Francis W. Crotty
THEIR ATTORNEY

Patented Oct. 20, 1953 2,656,414

UNITED STATES PATENT OFFICE

2,656,414

VIDEO-FROM-SYNC AND SYNC-FROM-SYNC SEPARATOR

Erwin M. Roschke, Broadview, and Walter S. Druz, Chicago, Ill., assignors to Zenith Radio Corporation, a corporation of Illinois Application May 21, 1949, Serial No. 94,642

3 Claims. (Cl. 178—7.3)

This invention relates to signal slicing circuits in which double clipping is effected in a single stage.

Throughout the specification, and in the appended claims, the term "slicing" is utilized to describe the operation of double clipping in a single stage. More particularly, the term is used to describe the operation of producing in a single stage an output signal which corresponds only to an intermediate amplitude-portion of the input signal.

In the reception of composite television signals comprising video-signal components representing picture information and synchronizing-signal pulses representing the timing of the horizontal and vertical scansions at the transmitter, it is necessary to provide means at the receiver for separating the synchronizing-signal pulses from the video-signal components. In order to obtain true synchronization of the receiver with the transmitter, it is desirable to subject the detected composite video signal to a double clipping operation, so that the output synchronizing-signal pulses from the synchronizing-signal separator correspond to an intermediate amplitude-portion or slice of the synchronizing-signal components of the composite video signal. The desired double clipping operation is accomplished, in conventional television receivers, by cascading a bottom clipping circuit and a top clipping circuit with a subsequent synchronizing-signal amplifying stage. The bottom clipper separates the synchronizing-signal components from the video-signal components of the composite video signal, and the top clipper removes extraneous noise pulses from the separated synchronizing-signal pulses.

It is an important object of the present invention to provide a signal slicing circuit which effectively performs double clipping in a single stage.

It is another object of the invention to provide a circuit for operating on a varying unidirectional input signal, as for example detected composite video signals, to provide a substantially constant output signal which corresponds only to an intermediate amplitude-portion of the input signal.

It is a further important object of the invention to provide a single stage synchronizing-signal slicing circuit for obtaining from detected composite video signals a series of output voltage pulses of substantially constant amplitude and of a frequency corresponding to that of the incoming synchronizing-signal pulses.

In accordance with the present invention, the above-mentioned objects are accomplished by utilizing an electron-discharge device having an electron gun including a cathode, a control system comprising an apertured accelerating electrode included in the electron gun and an input electrode following the accelerating electrode at a distance greater than the smallest transverse dimension of the aperture of the accelerating electrode, and an anode, and having an anode current vs. input electrode voltage characteristic comprising two voltage ranges of substantially zero transconductance separated by a voltage range of high transconductance and further having a low input grid conductance for all values of input grid voltage. There is provided a source of varying unidirectional signals having a voltage amplitude with respect to a reference signal level which is greater than the high transconductance range of the operating characteristic of the electron-discharge device and recurring at a predetermined frequency, and this source is coupled to the input grid and to the cathode of the electron-discharge device by means of an input circuit comprising an energy storage device. Resistance means are included in the input circuit and coupled between the input grid and the cathode and provide with the energy storage device a time constant at least as long as the period of the predetermined frequency of the varying unidirectional signals. A load impedance is coupled to the cathode and to either the accelerating electrode or the anode for deriving output signals corresponding to an intermediate slice of the varying unidirectional input signals.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 5:
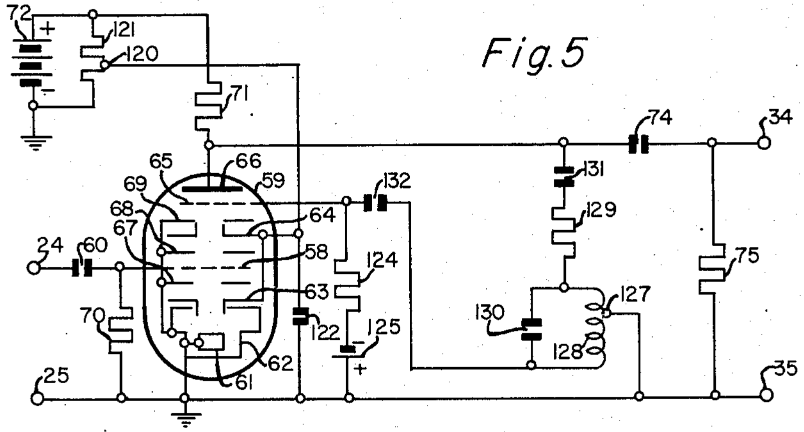
Figure 4:
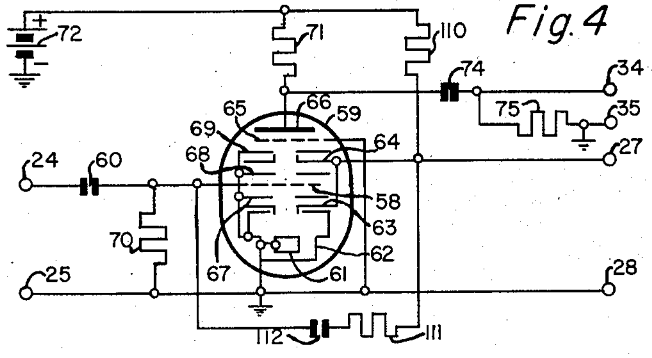
Figure 6:
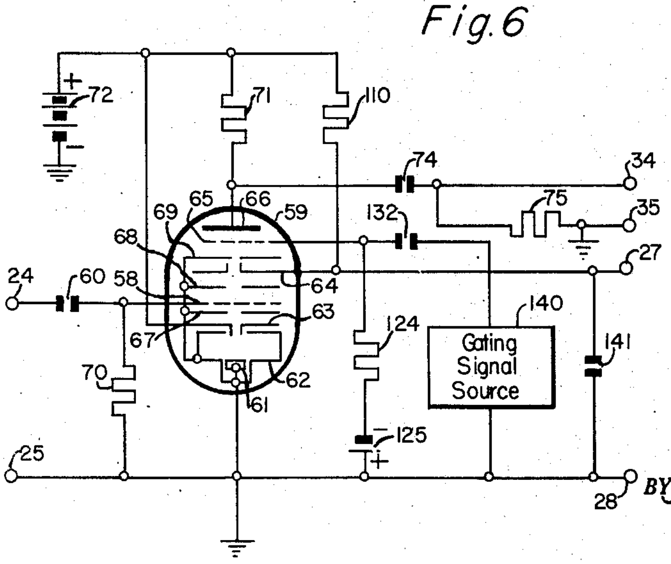

Figures 4, 5, and 6 are schematic circuit diagrams of other embodiments of the invention.

Figure 1:
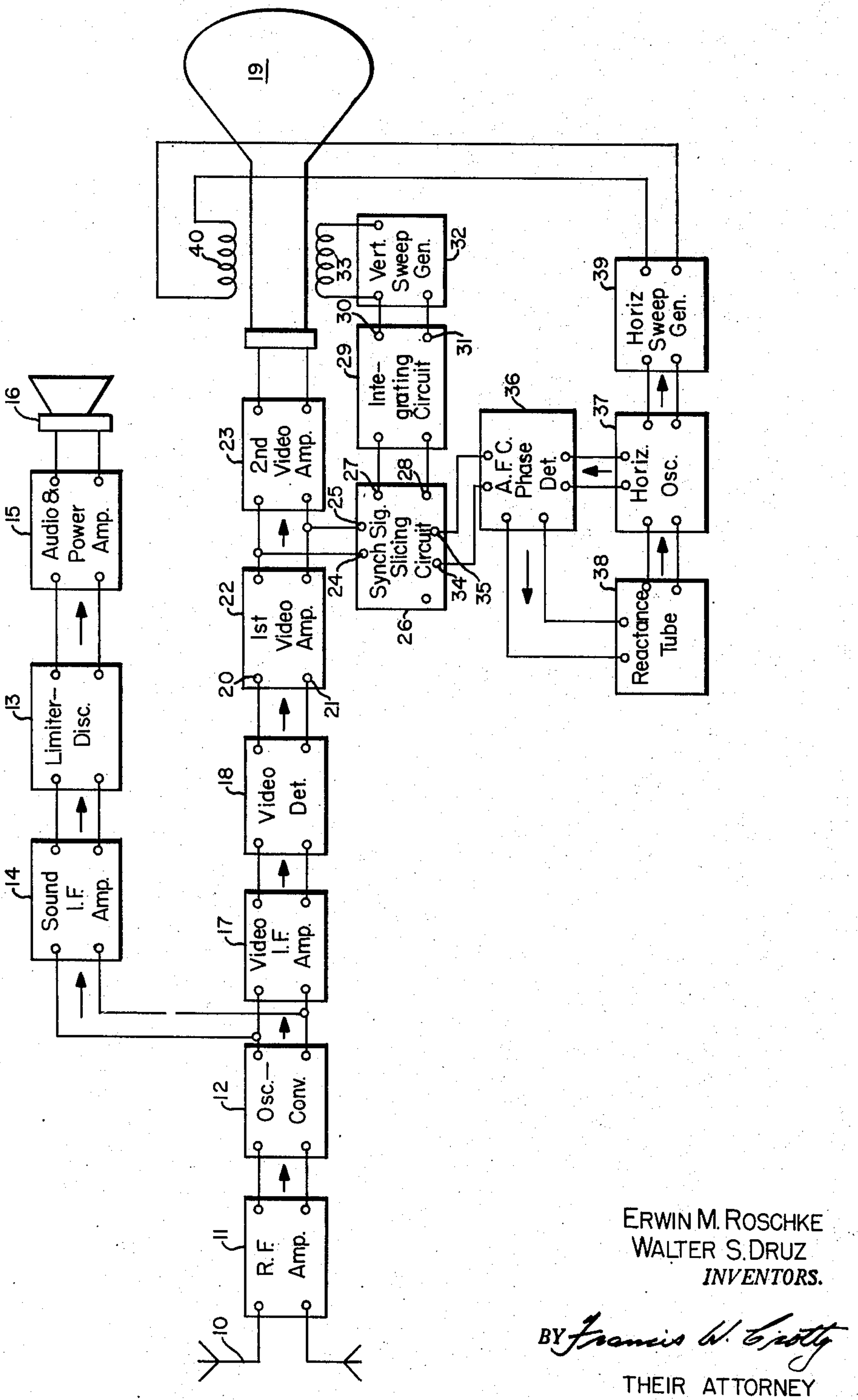
Figure 1 is a schematic block diagram of a television receiver constructed in accordance with the present invention.

Figure 1 is a schematic block diagram of an exemplary television receiver in which the present invention may be utilized to advantage; it is to be clearly understood that the invention is not to be limited in its application to receivers of the type shown in Figure 1 but that it may be utilized to advantage in any other type of television receiver, as for example, a television receiver of the inter-carrier sound type, or in any other apparatus in which it is desired to derive an output signal which corresponds to an intermediate amplitude-portion of a varying unidirectional input signal.

In the receiver of Figure 1, the incoming composite television signal is intercepted by an antenna 10, amplified by one or more stages of radio-frequency amplification 11, and applied to an oscillator-converter 12 where it is heterodyned with locally generated oscillations to provide intermediate-frequency video and sound signals. The intermediate-frequency sound signals from the output of oscillator-converter 12 are limited and detected by a limiter-discriminator 13 after passing through one or more stages of intermediate-frequency amplification 14, and the audio-frequency output from limiter-discriminator 13 is amplified by audio-frequency and power amplifier stages 15 and applied to a loudspeaker 16 or other sound-reproducing device.

The intermediate-frequency composite video signal from the output of oscillator-converter 12 is amplified by one or more stages of video intermediate-frequency amplification 17 and demodulated by a video detector 18. The detected composite video signal from the output of video detector 18 is applied to the input circuit of a cathode-ray tube or image-reproducing device 19 after video-frequency amplification in stages 22 and 23.

The amplified composite video signal from the output of first video amplifier 22 is applied to the input terminals 24 and 25 of a synchronizing-signal slicing circuit 26, the construction and operation of which are hereinafter described in detail. Synchronizing-signal slicing circuit 26 operates to provide output voltage pulses of substantially constant amplitude, which pulses correspond to the synchronizing-signal pulses of the composite video signal applied to input terminals 24 and 25. The output pulses from synchronizing-signal slicing circuit 26, appearing between output terminals 27 and 28 thereof, are supplied to an integrating circuit 29 which separates the vertical-frequency pulse components from the horizontal-frequency pulse components. The vertical-frequency pulse components appearing between output terminals 30 and 31 of integrating circuit 29 are applied to a vertical sweep generator 32 which supplies a vertical scanning signal to the vertical deflection coil 33 associated with image-reproducing device 19.

Output pulses appearing between terminals 34 and 35 of synchronizing-signal slicing circuit 26 are applied to an AFC (automatic frequency control) phase detector 36, where they are compared in phase with a signal from the horizontal oscillator 37. The output from AFC phase detector 36 is applied to the grid of a reactance tube 38 which controls the frequency of horizontal oscillator 37. A horizontal sweep generator 39, driven by horizontal oscillator 37, supplies a horizontal scanning signal to the horizontal deflection coil 40 associated with image-reproducing device 19.

While the illustrated receiver utilizes the horizontal-frequency output pulses from synchronizing-signal slicing circuit 26 to provide automatic frequency control of the horizontal oscillator, the invention is not limited to such an arrangement. For example, the horizontal-frequency output pulses may be utilized directly to drive the horizontal sweep generator 39.

Except for unit 26, which is to be considered further hereinafter, the several components of the receiver of Figure 1 may be of any well-known design and construction and the operation of the receiver is entirely conventional except for the manner in which synchronizing-signal separation is obtained. The manner of obtaining synchronizing-signal separation will now be described in detail.

Figure 2:
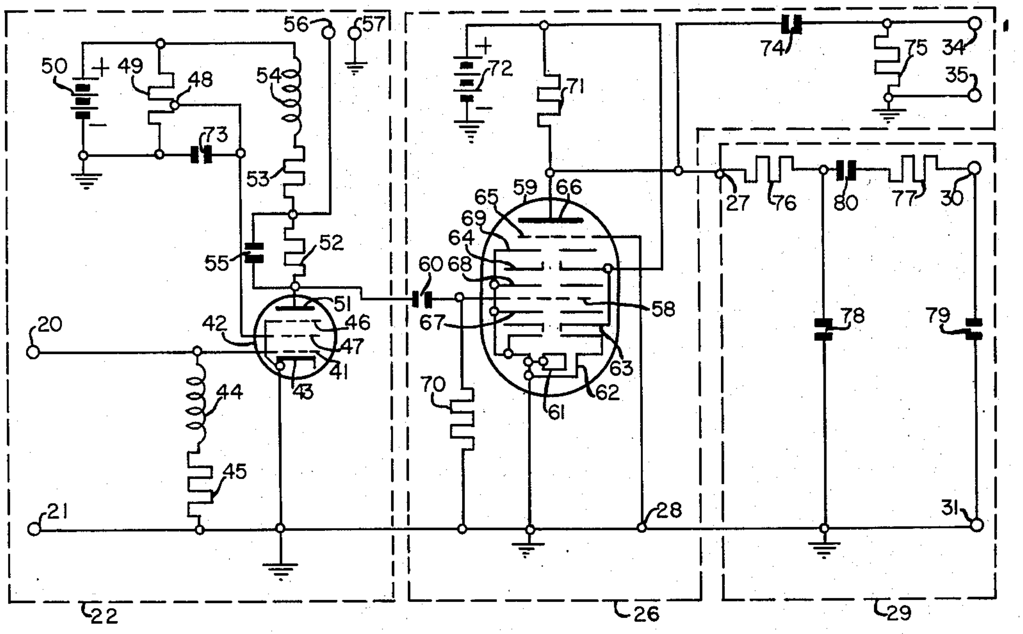
Figure 2 is a schematic circuit diagram of a portion of the receiver of Figure 1.

Figure 2 is a schematic circuit diagram of that part of the television receiver of Figure 1 which comprises first video amplifier 22, synchronizing-signal slicing circuit 26, and integrating circuit 29. One input terminal 20 of first video amplifier 22 is connected to the control grid 41 of an electron-discharge device 42, preferably of the pentode type, and the other input terminal 21 is directly connected to ground and to the cathode 43 of device 42. An inductor 44 and a resistor 45 are serially connected between control grid 41 and cathode 43. The suppressor grid 46 of device 42 is connected to cathode 43. The screen grid 47 of device 42 is connected to a tap 48 on a bleeder resistor 49 which is connected in shunt with a suitable source of positive unidirectional operating potential, here shown as a battery 50, the negative terminal of which is grounded. Screen grid 47 is also bypassed to ground by means of a condenser 73. The anode 51 of device 42 is connected to the positive terminal of battery 50 through a pair of series-connected resistors 52 and 53 and through a peaking coil 54. A condenser 55 is connected in parallel with resistor 52, and a pair of output terminals 56 and 57 are connected respectively to a point intermediate resistors 52 and 53 and to ground.

Anode 51 of device 42 is coupled to the input grid 58 of an electron-discharge device 59 by means of an energy storage device or condenser 60. Electron-discharge device 59 is of the gated-beam type disclosed and claimed in the copending applications of Robert Adler, Serial No. 7,864, filed February 12, 1948, for "Electron Discharge Devices," now U. S. Patent No. 2,511,143 issued June 13, 1950, and Serial No. 68,285, filed December 30, 1948, for "Electron Discharge Devices," now U. S. Patent No. 2,559,037 issued July 3, 1951, and both assigned to the same assignee as the present application. A device of this type comprises at least one control system arranged along the path of a focused electron beam and comprising a grid which follows an apertured accelerating electrode at a distance greater than the smallest transverse dimension of the aperture in the accelerating electrode. Thus, device 59 comprises, in addition to input grid 58, a cathode 61, a beam forming electrode 62 connected to cathode 61, a first accelerating electrode 63, a second accelerating electrode 64, a control grid 65, an anode 66, and focusing electrodes 67, 68 and 69 each of which is connected to cathode 61. In the embodiment of Figure 2, accelerating electrodes 63 and 64 are interconnected within the tube envelope.

Input grid 58 of device 59 is returned to ground and to cathode 61 through a grid resistor 70. Control grid 65 is directly connected to ground; this electrode is therefore utilized as a suppressor and is unnecessary to the application of device 59 in the present arrangement as sufficient suppression may be provided by focusing electrode 69. Alternatively, grid 65 may be directly connected to anode 66 or maintained at some fixed potential other than ground potential, or grid 65 may be omitted from device 59. Anode 66 of device 59 is connected through a load impedance 71, preferably a resistor, to the positive terminal of a suitable source of unidirectional operating potential, here shown as a battery 72, the negative terminal of which is grounded. Accelerating electrodes 63 and 64 are directly connected to the positive terminal of battery 72. Alternatively, accelerating electrodes 63 and 64 may be operated at a positive potential lower than that applied to anode 66.

Output terminals 34 and 35 of synchronizing-signal slicing circuit 26 are coupled respectively to anode 66 through a condenser 74 and to ground. An output resistor 75 is connected between output terminals 34 and 35. Output terminals 27 and 28 of synchronizing-signal slicing circuit 26 are directly connected respectively to anode 66 and to ground, and are also connected to the input terminals of integrating circuit 29 which comprises a pair of series resistors 76 and 77 and a pair of shunt condensers 78 and 79. A blocking condenser 80 is connected between resistors 76 and 77. Output terminals 30 and 31 of integrating circuit 29 are directly connected to the opposite terminals of condenser 79.

In operation, the composite video signal from the video detector 18 is applied between input terminals 20 and 21 of first video amplifier 22. Peaking coils 44 and 54 are utilized in the input circuit and output circuit respectively of device 42 to provide high-frequency compensation for the video-signal components of the composite video signal. Output terminals 56 and 57 are utilized for applying the amplified composite video signal to the second video amplifier; consequently, resistor 53 and peaking coil 54 constitute the entire load for the video-signal components. However, the signal which is supplied to the synchronizing-signal slicing circuit 26 is derived from the entire series combination of resistor 52, resistor 53 and peaking coil 54. Condenser 55 is utilized to bypass resistor 52 for the higher video-frequency components but not for the synchronizing-signal frequency components in order to provide a high-fidelity composite video signal between output terminals 56 and 57. The input signal applied to synchronizing-signal slicing circuit 26 is of a larger amplitude than the output composite video signal appearing between terminals 56 and 57, although the higher video-frequency components are attenuated; since synchronizing-signal slicing circuit 26 operates only on the synchronizing-signal components, this attenuation is in no way detrimental to the operation of that circuit.

Figure 3:
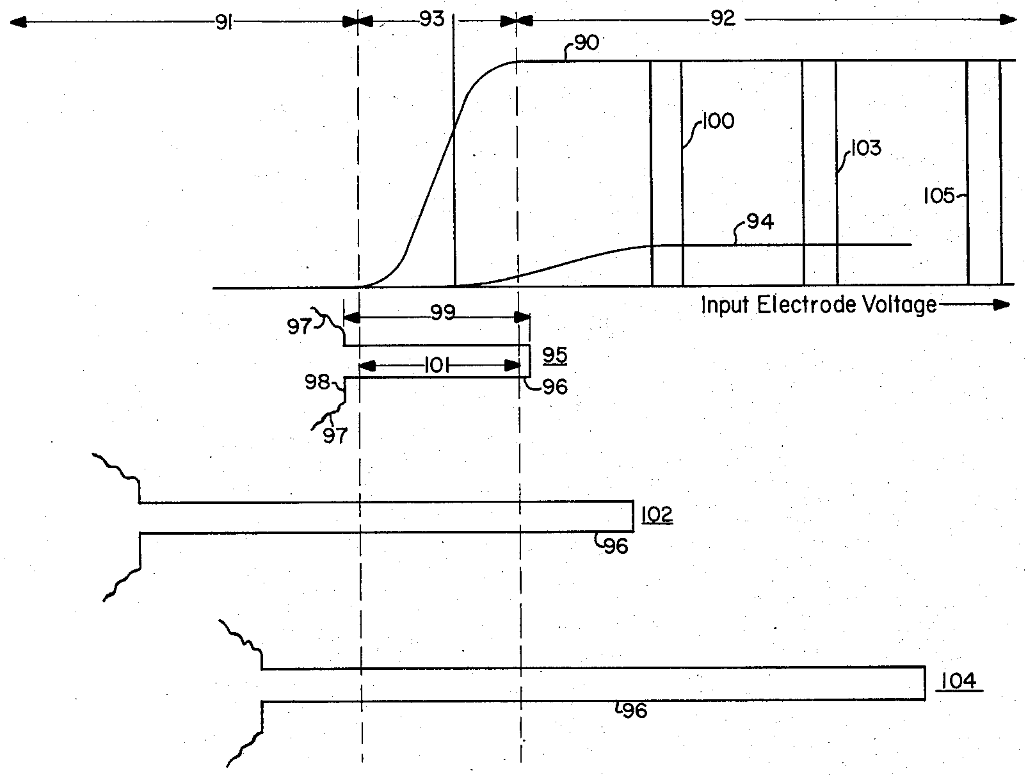
Figure 3 is a graphical representation illustrating the operation of the present invention, and of other embodiments of the invention.

The operation of the synchronizing-signal slicing circuit may best be understood from a consideration of the graphical representation of Figure 3. Curve 90 of Figure 3 represents the anode current vs. input grid voltage characteristic of a gated-beam electron discharge device such as device 59 of Figure 2. This transfer characteristic comprises two input grid voltage ranges 91 and 92 of substantially zero transconductance separated by a voltage range 93 of high (but finite) transconductance; such a characteristic is conveniently referred to as a step-function characteristic.

Curve 94 represents the input grid current vs. input grid voltage characteristic of the same discharge device. Characteristic 94 differs from the input grid current characteristic of conventional discharge devices in that the input electrode conductance (represented by the instantaneous slope of characteristic 94) is very low, even at large values of input electrode voltage, thereby providing a substantial input grid current limiting effect which is especially advantageous in the operation of the present invention.

In accordance with the invention, the input signal applied to input grid 58 of device 59 through coupling condenser 60 has a voltage amplitude with respect to a reference signal level which is greater than high-transconductance voltage range 93; such a condition is accomplished by suitable adjustment of the gain of first video amplifier 22 and by the above described arrangement for obtaining an input signal to the synchronizing-signal slicing circuit 26 of greater amplitude than the output composite video signal between terminals 56 and 57. Furthermore, the input signal is applied to device 59 with the synchronizing-signal pulses positive with respect to the video-signal components. Thus, the input signal appearing between input grid 58 and cathode 61 during reception of a weak signal may be represented by waveform 95. The input signal comprises synchronizing-signal pulses 96 and video-signal components fragmentarily indicated at 97. Blanking pedestals 98 provide a convenient reference signal level from which to measure the amplitude of the incoming synchronizing-signal pulses, and the amplitude 99 of such pulses with respect to reference signal level 98 is greater than high-transconductance voltage range 93. Proper positioning of the incoming signal 95 with respect to high transconductance voltage range 93 is assured by suitably adjusting the initial operating bias for input grid 58 and the time constant of condenser 60 and resistor 70. It may be necessary in some embodiments to utilize a cathode bias resistor or other source of negative unidirectional operating potential for input grid 58; however, suitable operation with zero initial operating bias for input grid 58 may be obtained with a device constructed in accordance with the above-identified Adler application, Serial No. 68,285.

With the arrangement illustrated in Figure 2, in the absence of any incoming composite video signal between terminals 20 and 21, input grid 58 is maintained near the direct potential of cathode 61. However, when a composite video signal such as that represented by waveform 95 is applied to the input circuit of device 59, current flows to the input grid 58 during the synchronizing-signal pulse intervals, and a negative bias potential is developed across resistor 70 with the result that the synchronizing-signal pulses 96 become so positioned, being positive with respect to the video-signal components, that they extend into both zero-transconductance ranges 91 and 92 of the transfer characteristic 90 of device 59. Consequently, both transconductance cutoffs are utilized, and an output voltage pulse 100 is developed across resistor 71. Pulse 100 corresponds to an intermediate amplitude-portion 101 of incoming pulse 96 and therefore represents a slice of the input pulse.

If, now, the input signal amplitude increases, as during reception of a stronger composite television signal representing the same transmitted image, the signal impressed on the input circuit of device 59 may be represented by waveform 102. Because the amplitude of the synchronizing-signal pulses 96 has been increased, more current flows to input grid 58 and a greater negative bias potential is developed across resistor 70. However, the low conductance of the input grid prevents the negative bias potential across resistor 70 from increasing proportionately with the input signal amplitude. Consequently, the output pulse 103 which is developed across resistor 71 again corresponds to a slice of the input pulse 96, but the thickness of this slice represents a smaller proportion of the input synchronizing-signal pulse amplitude, and the slice is taken farther from the peak.

If a still stronger incoming signal 104 representing the same transmitted image is applied to the input circuit of device 59, the negative bias potential developed across resistor 70 remains substantially constant, due to the limiting effect of input grid current characteristic 94. The output pulse 105 appearing across resistor 71 in response to a very strong input signal 104 thus corresponds to a still thinner slice of the input pulse 96 taken still farther from the peak.

For operation of the synchronizing-signal slicing circuit as described in accordance with the invention, it is essential that the time constant of condenser 60 and resistor 70 be at least as long as the period of the lowest-frequency recurrent component of the input signal for which it is desired to provide a corresponding output signal component. According to present standards, such lowest-frequency recurrent component of the composite video signal is the vertical synchronizing-signal component which is 60 cycles per second. Thus, the time constant of condenser 60 and resistor 70, for use with a composite video signal according to present standards, must be at least 1/60 second. Increase of the time constant above this minimum value operates to adjust the level relative to the synchronizing-signal peaks at which slicing is effected. In practice, the time constant is adjusted for proper operation with an input signal 95 just strong enough so that the synchronizing-signal pulses 96 span high-transconductance voltage range 93 of transfer characteristic 90 (Figure 3). Satisfactory operation is then achieved for input signal amplitudes up to at least ten times greater.

One very important advantage of the described embodiment of the present invention over conventional double clipping arrangements utilizing two cascaded stages becomes apparent from a consideration of Figure 3. Because the input grid current characteristic 94 is characterized by a low input grid conductance, even with large values of input grid voltage, thereby providing a limiting effect, random noise bursts which may be superimposed on the incoming synchronizing-signal pulses have substantially no effect on the negative bias voltage developed across resistor 70, even when such noise bursts are of extremely great amplitude. Consequently, apparatus constructed in accordance with the invention does not exhibit the tendency so common to prior art arrangements of biasing itself off in response to large noise bursts, thereby resulting in intermittent discontinuities in the output pulse occurrences.

It should be mentioned that, while optimum operation is obtained when the voltage amplitude 99 of the input signals is greater than the high-transconductance range 93 of the transfer characteristic, the device does not become inoperative in the event that the input signal amplitude should fall below this level, as in the reception of extremely weak signals. Under such conditions, single clipping only is accomplished, but the arrangement still affords the great advantage of being comparatively insensitive to random noise bursts of large amplitude.

With reference again to Figure 2, it is now apparent that the output voltage developed across resistor 71 comprises voltage pulses of substantially constant amplitude which occur at the frequency of the incoming synchronizing-signal pulses. Consequently, the output voltage from device 59 comprises two sets of pulses, one set corresponding to the incoming vertical synchronizing-signal pulses and the other set corresponding to the horizontal synchronizing-signal pulses. Those output pulses appearing across resistor 71 which correspond to the vertical synchronizing-signal pulses are separated from those corresponding to the horizontal synchronizing-signal pulses by integrating circuit 29, which functions in a conventional manner. Thus, the voltage appearing between output terminals 30 and 31 of integrating circuit 29 represents the vertical synchronizing-signal pulses and is utilized to drive the vertical sweep generator 32 (Figure 1). The output pulses appearing across load resistor 71 which correspond to the incoming horizontal synchronizing-signal pulses are differentiated by means of condenser 74 and resistor 75 and appear between output terminals 34 and 35 for application to the AFC phase detector 36 (Figure 1); condenser 74 also serves to prevent the application of the positive potential from battery 72 to output terminal 34.

Purely by way of illustration and in no sense by way of limitation, suitable operation of the circuit of Figure 2 has been achieved with the following component values:

| | |
|---|---|
| Electron-discharge device **42** | Type 6AU6 |
| Electron-discharge device **59** [1] | |
| Inductor **44** | 250 microhenries |
| Inductor **54** | 25 microhenries |
| Resistor **45** | 3,900 ohms |
| Resistor **52** | 15,000 ohms |
| Resistor **53** | 820 ohms |
| Resistor **70** | 2.7 megohms |
| Resistor **71** | 33,000 ohms |
| Resistor **75** | 18,000 ohms |
| Resistor **76** | 39,000 ohms |
| Resistor **77** | 15,000 ohms |
| Condenser **55** | 75 micro-microfarads |
| Condenser **60** | 0.1 microfarad |
| Condenser **73** | 20 microfarads |
| Condenser **74** | 50 micro-microfarads |
| Condenser **78** | 0.001 microfarad |
| Condenser **79** | 0.002 microfarad |
| Condenser **80** | 0.1 microfarad |

[1] A gated beam tube constructed in accordance with the above mentioned Adler application Serial No. 68,285. It is presently expected that type number 6BN6 will be assigned to this device.

It is also possible, in accordance with the present invention, to derive two sets of output pulses, each including components representing the horizontal synchronizing-signal pulses and the vertical synchronizing-signal pulses, from a single synchronizing-signal slicing circuit, the two sets of output pulses being of opposite polarity. An arrangement for accomplishing this end is illustrated schematically in Figure 4. The arrangement of Figure 4 is similar in many respects to the synchronizing-signal slicing circuit 26 of Figure 2; however, accelerating electrodes 63 and 64 of device 59 are coupled to the positive terminal of battery 72 by means of a load impedance 110, preferably a resistor. Output terminal 27 is connected to accelerating electrodes 63 and 64.

The operation of that portion of the circuit of Figure 4 thus far described is substantially identical with that of the synchronizing-signal slicing circuit 26 of Figure 2, with the exception that output voltage pulses are developed across both load resistor 71 and load resistor 110. Since substantially all electrons which are not collected by anode 66 are collected by first and second accelerating electrodes 63 and 64, the output voltage pulses appearing across the two load resistors 71 and 110 are of opposite polarity. Thus, if the detected composite video signal applied between terminals 24 and 25 comprises synchronizing-signal pulses which are positively oriented with respect to the video-signal components, the output voltage pulses appearing at output terminal 34 are of negative polarity, and those appearing at output terminal 27 are of positive polarity. The first mentioned output pulses may be supplied to the AFC phase detector, while the output pulses appearing at output terminal 27 may be applied to integrating circuit 29 of Figure 2 which operates to separate the vertical-frequency output pulses from the horizontal-frequency output pulses; with this arrangement, an integrating condenser (not shown) may be connected directly between terminals 27 and 28. Alternatively, if it is desired to derive vertical-frequency pulses of negative polarity and horizontal-frequency pulses of positive polarity, anode 66 may be connected to terminal 27 and accelerating electrodes 63 and 64 may be connected to the differentiating circuit comprising condenser 74 and resistor 75.

In accordance with another feature of the invention, the output pulses may be made to correspond to an even thinner slice of the incoming synchronizing-signal pulses by providing a feedback network coupled from accelerating electrodes 63 and 64 to input grid 58. The embodiment of Figure 4 includes such a feedback network comprising the series combination of a resistor 111 and a condenser 112 providing a feedback time constant which is at least as long as the time duration of the longest input pulse for which a corresponding output component is desired. (For example, under present standards, the time constant should be at least as long as the duration of an individual vertical synchronizing pulse, or 27.3 microseconds.) Thus, positive output pulses appearing across load resistor 110 are supplied in regenerative phase to input grid 58 with the result that the incoming signals are effectively expanded, and the output pulses correspond to a smaller proportion of the total incoming synchronizing-signal pulse amplitude. At the same time, attenuation is provided for composite video signals translated in the reverse direction along the feedback loop, due to the voltage divider action of resistors 110 and 111. With this arrangement, even greater noise rejection is accomplished than with previously described embodiments.

As a further embodiment of the invention, it is possible to obtain a gated horizontal-frequency pulse output corresponding to a thin slice of the incoming horizontal synchronizing-signal pulses. Reference is made to Figure 5, in which accelerating electrodes 63 and 64 are connected together and to a tap 120 on a bleeder resistor 121 connected in shunt with battery 72. Accelerating electrodes 63 and 64 are bypassed to ground by means of a condenser 122. The control grid 65 is returned to ground through a resistor 124 and a negative bias potential source 125. In some applications, negative biasing potential source 125 between resistor 124 and ground may not be required, sufficient biasing potential being developed across resistor 124 by virtue of the grid current drawn by control grid 65. Anode 66 is coupled to a coil 128 through a resistor 129 and a blocking condenser 131. Coil 128 and a parallel-connected condenser 130 comprise a parallel resonant circuit. An intermediate tap 127 on coil 128 is connected to ground, and the lower terminal of the tuned circuit comprising coil 128 and condenser 130 is coupled to control grid 65 through a condenser 132.

In operation, in the absence of a signal on control grid 65, output pulses of substantially constant amplitude, corresponding to thin slices of the incoming synchronizing-signal pulses, appear across load resistor 71, as explained in connection with the previous embodiments. However, in order to provide output pulses occurring at the horizontal-frequency only, oscillatory circuit comprising coil 128 and condenser 130 is tuned at or near the frequency of the horizontal synchronizing-signal pulses. Passive oscillations are induced in this oscillatory circuit by periodic excitation from the negative polarity horizontal-frequency output pulses, and the signal developed in the oscillatory circuit is applied with positive polarity to control grid 65 to serve as a gating signal. The component values of condenser 132 and resistor 124 are so chosen as to bias control grid 65 to cutoff except during the peak intervals of the gating signal. Consequently, the output voltage appearing between output terminals 34 and 35, coupled to anode 66 and to ground respectively, consists entirely of horizontal-frequency pulses.

In the embodiment of Figure 5, the gating signal applied to control grid 65 is generated in response to the appearance in the output circuit of device 59 of horizontal-frequency pulses. It is also within the scope of the invention to utilize any other type of gating signal source for supplying the gating signal to control grid 65.

The circuit of Figure 5 operates to provide gated horizontal-frequency output pulses; however, vertical-frequency output pulses are not developed in the output circuit. It is possible, in accordance with the invention, to obtain from a single electron discharge device of the above-mentioned gated beam type both vertical-frequency output pulses and gated horizontal-frequency output pulses if separate leads for the accelerating electrodes are provided. An arrangement for accomplishing this purpose is illustrated schematically in Figure 6.

The details of the circuit of Figure 6 are similar in many respects to the circuit of Figure 5. The first accelerating electrode 63 is directly connected to the positive terminal of battery 72, and the second accelerating electrode is connected to the positive terminal of battery 72 through load impedance 110. Alternatively, load impedance 110 may be connected between first accelerating electrode 63 and battery 72, and second accelerating electrode 64 may be directly connected to battery 72. A gating signal source 140 is coupled to control grid 65 by means of coupling condenser 132 and control grid resistor 124, the other terminal of gating signal source 140 being connected to ground. An integrating condenser 141 is directly connected between output terminals 27 and 28.

In operation, when no gating signal is applied to control grid 65 from source 140, output pulses of opposite polarity are developed across load resistors 71 and 110, as described in connection with the embodiment of Figure 4. The pulse outputs appearing across these two load resistors contain both horizontal-frequency and vertical-frequency components. The pulses appearing across load resistor 110 are applied across integrating condenser 141 and thence to integrating network 29 (Figure 2) for deriving vertical-frequency output pulses.

If, now, a gating signal of a frequency equal to that of the horizontal synchronizing-signal pulses is applied from source 140 to control grid 65 in proper phase relation with the horizontal synchronizing-signal pulses, the output pulses developed across load resistor 71, and consequently the pulses appearing between terminals 34 and 35 comprise only horizontal-frequency pulses, Vertical-frequency output pulses may be derived from resistor 110 as described above. Alternatively, gating signal source 140 may be so constructed as to generate a composite gating signal having horizontal-frequency and vertical-frequency components which are respectively in phase with the horizontal synchronizing-signal pulses and the vertical synchronizing-signal pulses, in order to obtain an output voltage across resistor 71 containing both horizontal-frequency and vertical-frequency components each of which are gated for increased noise rejection. Gated horizontal frequency pulses and gated vertical-frequency pulses may then be derived from resistor 71, or ungated pulses may be derived from resistor 110, depending on the polarity desired.

Thus, the invention provides, in its several embodiments, novel signal slicing circuits for effectively providing double clipping in a single stage. The invention is particularly adaptable to synchronizing-signal separation in a television receiver. The noise rejection accomplished by the use of the invention is materially better than that obtainable with more complicated prior art arrangements for accomplishing the same results. The invention is also applicable to use in apparatus other than television receivers. For example, the invention may be used to advantage in the reception of pulse-time modulated signals of the type wherein the desired signal is represented by the variation in timing of individual pulses in a recurrent series of pulses, where it is desired to obtain a signal representing an intermediate amplitude-portion of the incoming signal for high-fidelity signal reproduction.

While particular embodiments of the present invention have been shown and described, it is apparent that various changes and modifications may be made, and it is therefore contemplated in the appended claims to cover all such changes and modifications as fall within the true spirit and scope of the invention.

We claim:

1. A synchronizing-signal slicing circuit comprising: an electron-discharge device having an electron gun including a cathode, a control system comprising an apertured accelerating electrode included in said electron gun and an input grid following said accelerating electrode at a distance greater than the smallest transverse dimension of the aperture of said accelerating electrode, and an anode, and having an anode current vs. input grid voltage characteristic comprising two voltage ranges of substantially zero transconductance separated by a voltage range of high transconductance and further having a low input grid conductance for all values of input grid voltage; a source of composite video signals including synchronizing-signal pulses individually having a voltage amplitude with respect to a reference signal level which is greater than said high-transconductance voltage range and recurring at a predetermined frequency; an input circuit comprising a condenser for coupling said source to said input grid and to said cathode and further comprising resistance means coupled between said input grid and said cathode and providing with said condenser a time constant at least as long as the period of said predetermined frequency; a first load impedance coupled to said anode and to said cathode for deriving output voltage pulses of one polarity; and a second load impedance coupled to said accelerating electrode and to said cathode for deriving output voltage pulses of the opposite polarity.

2. A synchronizing-signal slicing circuit comprising: an electron-discharge device having an electron gun including a cathode, a control system comprising an apertured accelerating electrode included in said electron gun and an input grid following said accelerating electrode at a distance greater than the smallest transverse dimension of the aperture of said accelerating electrode, and an anode, and having an anode current vs. input grid voltage characteristic comprising two voltage ranges of substantially zero transconductance separated by a voltage range of high transconductance and further having a low input grid conductance for all values of input grid voltage; a source of composite video signals including video-signal components and also including synchronizing-signal pulses individually having a voltage amplitude with respect to a reference signal level which is greater than said high-transconductance voltage range and recurring at a predetermined frequency; an input circuit comprising a condenser for coupling said source to said input grid and to said cathode to apply said composite signals to said input grid with said synchronizing-signal pulses positive with respect to said video-signal components and further comprising a resistor coupled between said input grid and said cathode and providing with said condenser a time constant at least as long as the period of said predetermined frequency; a load impedance coupled to said accelerating electrode and to said cathode; and a feedback network coupled from said load impedance to said input grid and comprising the series combination of a resistor and a condenser for supplying a portion of the voltage across said load impedance in regenerative phase to said input grid.

3. A synchronizing-signal slicing circuit comprising: an electron discharge device having in the order named an electron gun including a cathode, a control system comprising a first accelerating electrode included in said electron gun and an input grid following said first accelerating electrode at a distance greater than the smallest transverse dimension of the aperture of said first accelerating electrode, a second accelerating electrode, a control grid, and an anode, and having an anode current vs. input grid voltage characteristic comprising two voltage ranges of substantially zero transconductance separated by a voltage range of high transconductance and further having a low input grid conductance for all values of input grid voltage; a source of composite video signals including two sets of synchronizing-signal pulses individually having a voltage amplitude with respect to a reference signal level which is greater than said high-transconductance voltage range and recurring at predetermined frequencies; an input circuit comprising a condenser for coupling said source to said input grid and to said cathode and further comprising resistance means coupled between said input grid and said cathode and providing with said condenser a time constant at least as long as the period of the lowest of said predetermined frequencies; a source of gating signals which are substantially in phase with one of said sets of synchronizing-signal pulses; means for coupling said source to said control grid and to said cathode and for biasing said control grid to pass space current only during the peak intervals of said gating signals; a first load impedance coupled to said anode and to said cathode for deriving gated output voltage pulses of substantially constant amplitude occurring at the frequency of said one set of synchronizing-signal pulses; and a second load impedance coupled to one of said accelerating electrodes and to said cathode for deriving output voltage pulses of substantially constant amplitude and including components corresponding to each of said sets of synchronizing-signal pulses.

ERWIN M. ROSCHKE.
WALTER S. DRUZ.

References Cited in the file of this patent

UNITED STATES PATENTS

| Number | Name | Date |
|---|---|---|
| 2,163,217 | Schlesinger | June 20, 1939 |
| 2,211,860 | Plaistowe | Aug. 20, 1940 |
| 2,356,141 | Applegarth | Aug. 22, 1944 |
| 2,369,749 | Nagy et al. | Feb. 20, 1945 |
| 2,431,577 | Moore | Nov. 25, 1947 |
| 2,511,143 | Adler | June 13, 1950 |
| 2,559,037 | Adler | July 3, 1951 |

FOREIGN PATENTS

| Number | Country | Date |
|---|---|---|
| 108,190 | Australia | Aug. 17, 1939 |